(12) United States Patent
Yamamoto

(10) Patent No.: US 6,757,028 B2
(45) Date of Patent: Jun. 29, 2004

(54) TELEVISION TUNER FOR REDUCING POWER CONSUMPTION AND VIDEO DEVICE USING THE TELEVISION TUNER

(75) Inventor: Masaki Yamamoto, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 425 days.

(21) Appl. No.: 09/898,928

(22) Filed: Jul. 2, 2001

(65) Prior Publication Data

US 2002/0018147 A1 Feb. 14, 2002

(30) Foreign Application Priority Data

Jul. 3, 2000 (JP) ....................................... 2000-205585

(51) Int. Cl.[7] .............................. H04N 5/63; H04N 5/50
(52) U.S. Cl. ...................................... 348/731; 348/730
(58) Field of Search ................................ 348/730, 731, 348/553, 725

(56) References Cited

U.S. PATENT DOCUMENTS

| | | | | |
|---|---|---|---|---|
| 3,584,307 A | * | 6/1971 | Hewie ..................... 455/163.1 |
| 4,281,349 A | * | 7/1981 | George ........................ 348/733 |
| 5,701,599 A | * | 12/1997 | Aihara ..................... 455/186.1 |
| 5,905,544 A | * | 5/1999 | Lee ............................. 348/730 |
| 5,953,636 A | * | 9/1999 | Keate et al. ................ 455/3.02 |
| 6,177,964 B1 | * | 1/2001 | Birleson et al. ............ 348/725 |

FOREIGN PATENT DOCUMENTS

| | | |
|---|---|---|
| JP | 5-91487 | 4/1993 |
| JP | 2000-299826 | 10/2000 |

* cited by examiner

*Primary Examiner*—Victor R. Kostak
(74) *Attorney, Agent, or Firm*—Brinks Hofer Gilson & Lione

(57) ABSTRACT

When a television signal is not received, supply of a power supply voltage to the inner circuits is stopped to save the electric current consumed. A television tuner comprises at least a mixer circuit for frequency-converting a television signal to an intermediate-frequency signal, a local oscillation circuit for inputting a local oscillation signal to the mixer circuit, an intermediate-frequency amplifier circuit for amplifying the intermediate-frequency signal, and a PLL circuit for controlling the oscillating frequency of the local oscillation circuit, the television tuner further comprising switch means for supplying a power supply voltage to the mixer circuit, the local oscillation circuit, the intermediate-frequency amplifier circuit, and the PLL circuit, wherein when the television signal is received, the switch means is turned on, and when the television signal is not received, the switch means is turned off.

1 Claim, 2 Drawing Sheets

TELEVISION TUNER FOR REDUCING POWER CONSUMPTION AND VIDEO DEVICE USING THE TELEVISION TUNER

BACKGROUND OF THE INVENTION

1. Field of the Invention

The present invention relates to a television tuner which supplies a power supply voltage to the respective circuits when a television signal is received, and cuts the supply of the power supply voltage to a specific circuit when the television signal is not received, thereby reducing the power consumption, and a video device using the television tuner.

2. Description of the Prior Art

A conventional television tuner (hereinafter referred to simply as a tuner) is provided with various circuits such as a high-frequency amplifier circuit, a mixer circuit, a local oscillation circuit and an intermediate-frequency amplifier circuit which are operated by supplying a power supply voltage, and a power supply terminal to which a power supply voltage is applied. A power supply voltage is applied from a television receiver with the tuner incorporated to the power supply terminal. The power supply voltage applied to the power supply terminal is supplied uniformly to these circuits.

In general, a television receiver is connected to a VCR and is used for reception of a television signal and for replay of the VCR. In either case, while the power supply of the television receiver is turned on, a power supply voltage is supplied to the tuner. Thus, the power supply voltage is supplied to the tuner not required to be operated when the VCR is replayed, resulting in a waste of power consumption.

SUMMARY OF THE INVENTION

Accordingly, an object of the present invention is to provide a tuner which stops supply of a power supply voltage to the inner circuits to save electric current consumed when a television signal is not received, and a video device using such a tuner.

To solve the foregoing problems, a television tuner of the present invention comprises at least a mixer circuit for frequency-converting a television signal to an intermediate-frequency signal, a local oscillation circuit for inputting a local oscillation signal to the mixer circuit, an intermediate-frequency amplifier circuit for amplifying the intermediate-frequency signal, and a PLL circuit for controlling the oscillating frequency of the local oscillation circuit, the television tuner further comprising switch means for supplying a power supply voltage to the mixer circuit, the local oscillation circuit, the intermediate-frequency amplifier circuit, and the PLL circuit, wherein when the television signal is received, the switch means is turned on, and when the television signal is not received, the switch means is turned off.

In the television tuner of the present invention, the mixer circuit, the local oscillation circuit, the intermediate-frequency amplifier circuit, and the PLL circuit are constructed in one package of an integrated circuit, the switch means is provided with a first switch element, the power supply voltage is supplied through the first switch element to the mixer circuit, the local oscillation circuit, the intermediate-frequency amplifier circuit, and the PLL circuit, and the first switch element is constructed in the integrated circuit.

In the television tuner of the present invention, a video intermediate-frequency circuit is provided outside the integrated circuit so as to process the intermediate-frequency signal amplified by the intermediate-frequency amplifier circuit, and to have a video signal output terminal for outputting a video signal and an audio signal output terminal for outputting an audio signal, the switch means is provided with a second switch element, the power supply voltage is supplied through the second switch element to the video intermediate-frequency circuit, and the second switch element is provided outside the integrated circuit.

A video device of the present invention comprises the television tuner as described above, an external video terminal to be fed an external video signal, an external audio terminal to be fed an external audio signal, a video signal process circuit, an audio signal process circuit, and video/audio switching means, wherein when the television signal is received, the video/audio switching means connects the video signal output terminal to the video signal process circuit and connects the audio signal output terminal to the audio signal process circuit, and when the television signal is not received, the video/audio switching means connects the external video terminal to the video signal process circuit and connects the external audio terminal to the audio signal process circuit.

PREFERRED EMBODIMENTS OF THE INVENTION

Figure 1:
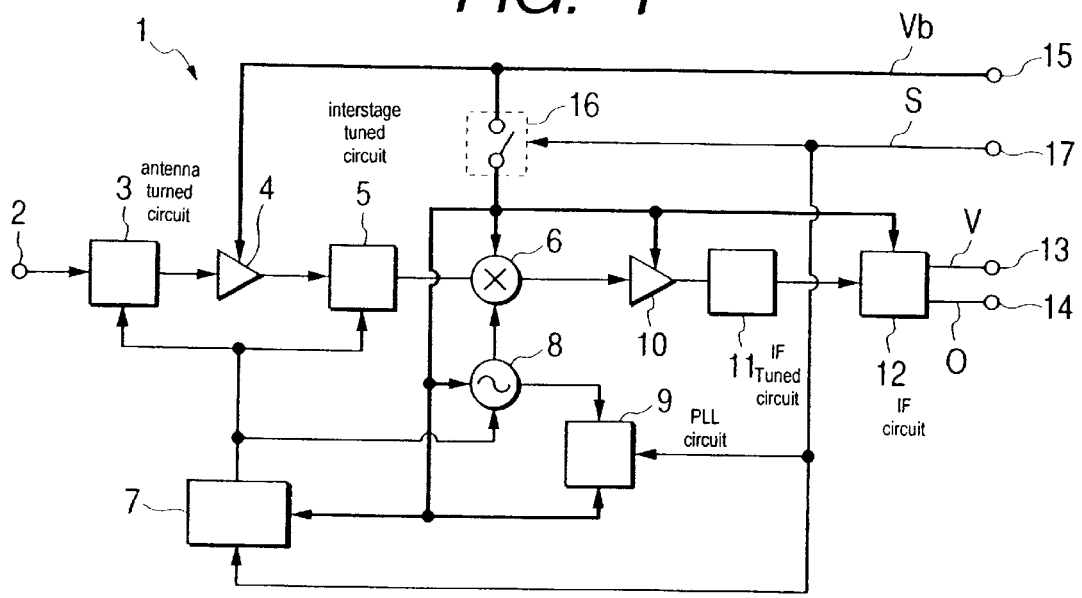
FIG. 1 is a block diagram showing the basic construction of a television tuner of the present invention.

FIG. 1 shows the basic construction of a television tuner (hereinafter referred to simply as a tuner) 1 of the present invention. FIG. 1 shows the construction example of a VHF tuner, in which television signals are inputted to an antenna terminal 2, and then, the desired television signals pass through an antenna tuned circuit 3 to be inputted to a high-frequency amplifier circuit 4. An interstage tuned circuit 5 removes the unnecessary signals, so that the remaining signals are inputted to a mixer circuit 6. The antenna tuned circuit 3 and the interstage tuned circuit 5 are switched so as to be tuned to the VHF low band or the VHF high band. This switching is controlled by a band switching circuit 7.

In the mixer circuit 6, the television signal received is mixed with a local oscillation signal inputted from a local oscillation circuit 8 so as to be frequency-converted to an intermediate-frequency signal. The local oscillation circuit 8 has a resonance circuit for determining an oscillating frequency (see FIG. 2). In the resonance circuit, the bands of the resonance frequency are switched by the band switching circuit 7, and the oscillating frequency is set by the tuning voltage outputted from a PLL circuit 9. The tuning frequency of the antenna tuned circuit 3 and the interstage tuned circuit 5 is also set by the tuning voltage outputted from the PLL circuit 9.

The intermediate-frequency signal is amplified by an intermediate-frequency amplifier circuit 10, and then, is inputted through an intermediate-frequency tuned circuit 11 to a video intermediate-frequency circuit 12. The intermediate-frequency signal inputted is demodulated by the video intermediate-frequency circuit 12. A video signal V and an audio signal O are outputted to a video signal output terminal 13 and an audio signal output terminal 14, respectively.

A power supply voltage Vb outputted from a power supply circuit 27 (see FIG. 3) of the television receiver is applied to a power supply terminal 15. The power supply voltage Vb is supplied directly to the high-frequency amplifier circuit 4, and is supplied through switch means 16 to the mixer circuit 6, the band switching circuit 7, the local oscillation circuit 8, the PLL circuit 9, the intermediate-frequency amplifier circuit 10, and the video intermediate-frequency circuit 12.

A station-selection signal S of a predetermined format outputted from station-selection means 29 (see FIG. 3) of the television receiver is inputted to a station-selection terminal 17. The station-selection signal S includes a mode signal for switching the television receiver between the reception state (the reception mode) and the non-reception state (the standby mode), a channel signal for specifying a reception channel, and a band signal for switching the reception bands.

The band switching circuit 7 is controlled by the band signal, and the PLL circuit 9 is controlled by the channel signal. The switch means is controlled by the mode signal, and is brought into the closed state in the reception mode, and is brought into the open state in the standby mode.

In the construction described above, the switch means 16 is brought into the closed state in the reception mode, and a power supply voltage is supplied to the mixer circuit 6, the band switching circuit 7, the local oscillation circuit 8, the PLL circuit 9, the intermediate-frequency amplifier circuit 10, and the video intermediate-frequency circuit 12. At this time, the total electric current consumed is about 140 mA (milliampere).

The antenna tuned circuit 3 and the interstage tuned circuit 5 are switched so as to be tuned to the frequency band of the television signal received, and the tuning frequency thereof is tuned to the television signal of a channel to be desired. The local oscillation circuit 8 oscillates at a predetermined frequency. As a result, the television signal of the channel to be desired can be received.

Since the switch means 16 is brought into the open state in the reception mode, the power supply voltage Vb is not supplied to the mixer circuit 6, the band switching circuit 7, the local oscillation circuit 8, the PLL circuit 9, the intermediate-frequency amplifier circuit 10, and the video intermediate-frequency circuit 12. The total electric current consumed is reduced to about 10 mA.

When the television receiver with the tuner 1 of the present invention incorporated is connected to the VCR for use, the television receiver is brought into the standby mode when the VCR is replayed, and does not receive a television signal. Thus, the electric current consumed during that time can be saved.

Figure 2:
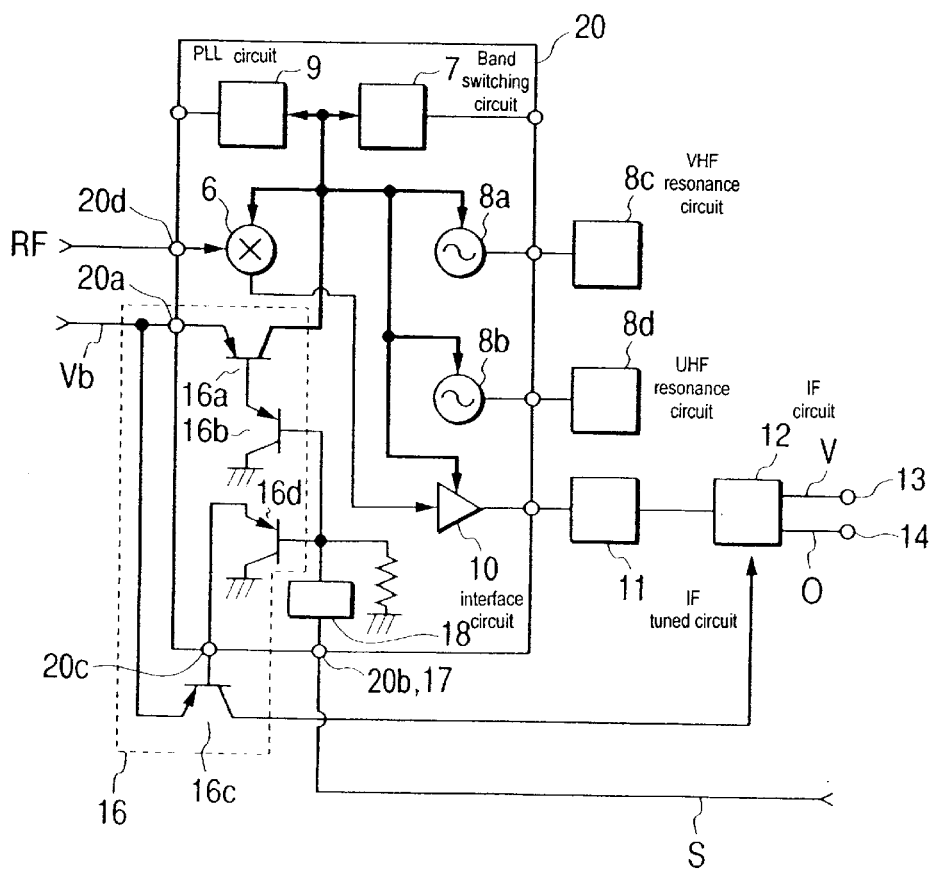
FIG. 2 is a block diagram showing a specific construction of the television tuner of the present invention.

FIG. 2 shows the specific construction of the tuner 1 of the present invention. The integrated circuit (IC) of a recent tuner has been advanced, and a mixer circuit, a local oscillation circuit, an intermediate-frequency amplifier circuit, a band switching circuit, and a PLL circuit are generally provided in one package of the IC. The present invention has, in one package of an integrated circuit 20, the mixer circuit 6, the band switching circuit 7, the local oscillation circuit 8, the PLL circuit 9, and the intermediate-frequency amplifier circuit 10 and has, in the integrated circuit 20, part or all of the circuit constructing the switch means 16.

Since the integrated circuit 20 shown in FIG. 2 is constructed so as to receive a VHF television signal or a UHF television signal, the integrated circuit 20 has a VHF local oscillation circuit 8a and a UHF local oscillation circuit 8b. The illustration of part of the signal line connecting the respective circuits in the integrated circuit 20 is omitted.

Outside the integrated circuit 20, there are provided a VHF resonance circuit 8c connected to the VHF local oscillation circuit 8a, a UHF resonance circuit 8d connected to the UHF local oscillation circuit 8b, the intermediate-frequency tuned circuit 11, and the video intermediate-frequency circuit 12. The antenna tuned circuit 3 to the interstage tuned circuit 5 are provided outside the integrated circuit 20, but the illustration thereof is omitted in FIG. 2.

The integrated circuit 20 is provided with a power supply terminal 20a and a station-selection signal input terminal 20b. The power supply terminal 20a is connected to the power supply terminal 15 of the tuner 1. The station-selection signal input terminal 20b is the station-selection terminal 17 of the tuner 1. The switch means 16 has a PNP type first transistor 16a to fourth transistor 16d. The first transistor 16a, the second transistor 16b, and the fourth transistor 16d are provided in the integrated circuit 20, and the third transistor 16c is provided outside the integrated circuit 20.

The emitter of the first transistor 16a is connected to the power supply terminal 20a, and the collector thereof is connected to the respective voltage supply end of the mixer circuit 6, the band switching circuit 7, the VHF local oscillation circuit 8a, the UHF local oscillation circuit 8b, the PLL circuit 9, and the intermediate-frequency amplifier circuit 10. The first transistor is a first switch element for supplying the power supply voltage Vb to the circuits described above. The base of the first transistor 16a is connected to the emitter of the second transistor 16b, and the collector thereof is grounded. The first transistor 16a is driven by the second transistor 16b.

The emitter of the third transistor 16c provided outside the integrated circuit 20 is connected to the power supply terminal 20a, and the collector thereof is connected to the voltage supply end of the video intermediate-frequency circuit 12. The third transistor 16c is a second switch element for supplying the power supply voltage Vb to the video signal process circuit 12. The base of the third transistor 16c is connected through a relay terminal 20c of the integrated circuit 20 to the emitter of the fourth transistor 16d, and the collector thereof is grounded. The third transistor 16c is driven by the fourth transistor 16d.

The base of the second transistor 16b and the base of the fourth transistor 16d are interconnected, and are connected through an interface circuit 18 to the station-selection signal input terminal 20b (the station-selection terminal 17). The mode signal is inputted to the interface circuit 18, and the output is at a low level in the reception mode, and is at a high level in the standby mode.

In the construction described above, the television signal outputted from the interstage tuned circuit 5 is inputted to an RF input terminal 20d, and is inputted to the mixer circuit 6.

The station-selection signal S is inputted to the station-selection signal input terminal 20b (the station-selection terminal 17), and is also inputted to the band switching circuit 7 and the PLL circuit 9 by the signal line, not shown, in the integrated circuit 20.

When the output of the interface circuit 18 is at a high level based on the station-selection signal S (the mode signal), the second transistor 16b is turned off, and the first transistor 16a is also turned off. The power supply voltage Vb is not supplied to the mixing circuit 6, the band switching circuit 7, the VHF local oscillation circuit 8a, the UHF local oscillation circuit 8b, the PLL circuit 9, and the intermediate-frequency amplifier circuit 10.

At the same time, the fourth transistor 16d and the third transistor 16c are also turned off, and the power supply voltage Vb is not supplied to the video intermediate-frequency circuit 12.

When the output of the interface circuit 18 is at a low level, the second transistor 16b is turned on, and the first transistor 16a is also turned on. As a result, the power supply voltage Vb is supplied to the mixer circuit 6, the band switching circuit 7, the VHF local oscillation circuit 8a, the UHF local oscillation circuit 8b, the PLL circuit 9, and the intermediate-frequency amplifier circuit 10.

At the same time, the fourth transistor 16d and the third transistor 16c are also turned on, and the power supply voltage Vb is supplied to the video intermediate-frequency circuit 12.

The first transistor 16a supplies the power supply voltage only to the respective circuits provided in the integrated circuit 20 (the mixer circuit 6, the band switching circuit 7, the VHF local oscillation circuit 8a, the UHF local oscillation circuit 8b, the PLL circuit 9, and the intermediate-frequency amplifier circuit 10). Thus, the electric current value that flows when the first transistor 16a is turned on is not increased or decreased. Nor does the allowable electric current value of the first transistor 16a change. The first transistor 16a is provided in the integrated circuit 20 so as to reduce the number of the parts outside the integrated circuit 20, thereby cutting the cost.

The third transistor 16c supplies the power supply voltage to the video intermediate-frequency circuit 12 provided outside the integrated circuit 20, and can also supply the power supply voltage to, for example, the high-frequency amplifier circuit 4. In this case, the allowable electric current value required of the fourth transistor 16c is increased to handle the additional components. Since the third transistor 16c is provided outside the integrated circuit 20, it can be replaced with a transistor having a large allowable electric current value. It is possible to select the electric current rating of the third transistor 16c corresponding to the magnitude of the electric current supplied to the circuit outside the integrated circuit 20.

Figure 3:
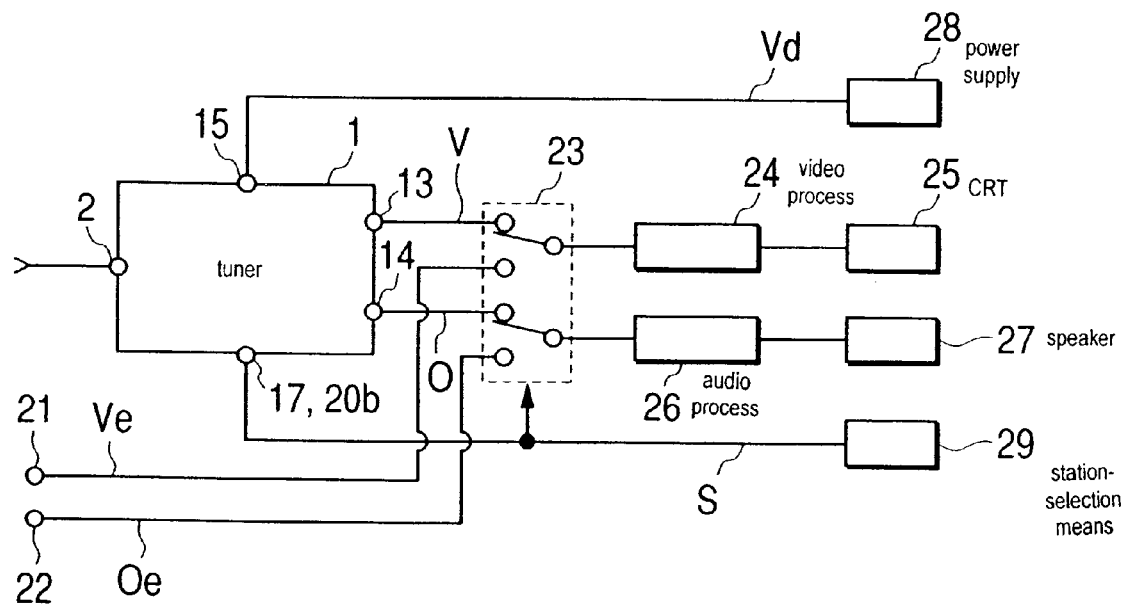
FIG. 3 is a block diagram showing the construction of a television receiver using the television tuner of the present invention.

FIG. 3 shows the construction of a video device using the tuner 1 of the present invention, for example, the television receiver, and is provided with an external video terminal 21, an external audio terminal 22, a video/audio switching means 23, a video process circuit 24, a CRT 25, an audio process circuit 26, a speaker 27, a power supply circuit 28, and station-selection means 29. For example, an external video signal Ve replayed by the VCR, not shown, is inputted to the external video terminal 21, and an external audio signal Oe is inputted to the external audio terminal 22.

The power supply voltage Vb is applied from the power supply circuit 28 to the power supply terminal 15 of the tuner 1. The station-selection signal S is inputted from the station-selection means 29 to the station-selection terminal 17 (the station-selection signal input terminal 20b).

The video/audio switching means 23 is given the video signal V from outputted from the video signal output terminal 13 of the tuner 1, the audio signal O outputted from the audio signal output terminal 14, the external video signal Ve, and the external audio signal Oe.

The video/audio switching means 23 switches between the video signal V outputted from the tuner 1 and the external video signal Ve for input to the video process circuit 24. The video/audio switching means 23 switches between the audio signal O outputted from the tuner 1 and the external audio signal Oe for input to the audio process circuit 26. The switching is controlled by the mode signal included in the station-selection signal S.

In the reception mode, the power supply voltage Vb is supplied to the respective circuits of the tuner 1. The video signal output terminal 13 is connected to the video signal process circuit 24, so that the video signal V is inputted to the video signal process circuit 24. The audio signal output terminal 14 is connected to the audio signal process circuit 26, so that the audio signal O is inputted to the audio signal process circuit 26.

In the standby mode, the power supply voltage is not supplied to the respective circuits of the tuner 1. The external video terminal 21 is connected to the video process circuit 24, so that the external video signal Ve is inputted to the video signal process circuit 24. The external audio terminal 22 is connected to the audio signal process circuit 26, so that the external audio signal Oe is inputted to the audio signal process circuit 24. In the respective modes, a video is outputted to the CRT 25, and an audio is outputted to the speaker 27.

In the standby mode, the external video signal Ve and the external audio signal Oe replayed by the VCR are inputted to the television receiver. At this time, the electric current consumed of the tuner 1 can be saved.

As described above, the television tuner of the present invention comprises at least a mixer circuit for frequency-converting a television signal to an intermediate-frequency signal, a local oscillation circuit for inputting a local oscillation signal to the mixer circuit, an intermediate-frequency amplifier circuit for amplifying the intermediate-frequency signal, and a PLL circuit for controlling the oscillating frequency of the local oscillation circuit, the television tuner further comprising switch means for supplying a power supply voltage to the mixer circuit, the local oscillation circuit, the intermediate-frequency amplifier circuit, and the PLL circuit, wherein when the television signal is received, the switch means is turned on, and when the television signal is not received, the switch means is turned off. When the television signal is not received, the electric current consumed can be saved greatly.

In the television tuner of the present invention, the mixer circuit, the local oscillation circuit, the intermediate-frequency amplifier circuit, and the PLL circuit are constructed in one package of an integrated circuit, the switch means is provided with a first switch element, the power supply voltage is supplied through the first switch element to the mixer circuit, the local oscillation circuit, the intermediate-frequency amplifier circuit, and the PLL circuit, and the first switch element is constructed in the integrated circuit. The number of the parts outside the integrated circuit can be reduced, thereby cutting the cost.

In the television tuner of the present invention, a video intermediate-frequency circuit is provided outside the integrated circuit so as to process the intermediate-frequency signal amplified by the intermediate-frequency amplifier circuit, and to have a video signal output terminal for outputting a video signal and an audio signal output terminal for outputting an audio signal, the switch means is provided with a second switch element, the power supply voltage is supplied through the second switch element to the video intermediate-frequency circuit, and the second switch element is provided outside the integrated circuit. Even when the electric current consumed of the circuit outside the integrated circuit is changed, the second switch element having the standards corresponding thereto can be selected for use.

The video device of the present invention comprises the television tuner, an external video terminal to be fed an external video signal, an external audio terminal to be fed an external audio signal, a video signal process circuit, an audio signal process circuit, and video/audio switching means, wherein when the television signal is received, the video/audio switching means connects the video signal output terminal to the video signal process circuit and connects the audio signal output terminal to the audio signal process circuit, and when the television signal is not received, the video/audio switching means connects the external video terminal to the video signal process circuit and connects the external audio terminal to the audio signal process circuit. The video signal and the audio signal replayed can be inputted to the television receiver when the VCR is replayed, thereby saving the electric current consumption of the television tuner at this time.

What is claimed is:

1. A video device comprising:
   an external video terminal to be fed an external video signal;
   an external audio terminal to be fed an external audio signal;
   a video signal process circuit;
   an audio signal process circuit;
   a video/audio; and
   a television tuner including:
      a mixer circuit to frequency-convert a television signal to an intermediate-frequency signal;
      a local oscillation circuit that inputs a local oscillation signal to the mixer circuit;
      an intermediate-frequency amplifier circuit to amplify the intermediate-frequency signal;
      a PLL circuit to control the oscillating frequency of the local oscillation circuit; and
      a switch to supply a power supply voltage to the mixer circuit, the local oscillation circuit, the intermediate-frequency amplifier circuit, and the PLL circuit,
   wherein
      when the television signal is received, the switch is turned on, and when the television signal is not received, the switch is turned off,
      the mixer circuit, the local oscillation circuit, the intermediate-frequency amplifier circuit, and the PLL circuit are constructed in one package of an integrated circuit, the switch is provided with a first switch element, the power supply voltage is supplied through the first switch element to the mixer circuit, the local oscillation circuit, the intermediate-frequency amplifier circuit, and the PLL circuit, and the first switch element is constructed in the integrated circuit,
      a video intermediate-frequency circuit is provided outside the integrated circuit to process the intermediate-frequency signal amplified by the intermediate-frequency amplifier circuit, and to have a video signal output terminal to output a video signal and an audio signal output terminal to output an audio signal, the switch is provided with a second switch element, the cower supply voltage is supplied through the second switch element to the video intermediate-frequency circuit, and the second switch element is provided outside the integrated circuit, and
      when the television signal is received, the video/audio switch connects the video signal output terminal to the video signal process circuit and connects the audio signal output terminal to the audio signal process circuit, and when the television signal is not received, the video/audio switch connects the external video terminal to the video signal process circuit and connects the external audio terminal to the audio signal process circuit.

* * * * *